(12) United States Patent
Araki et al.

(10) Patent No.: US 6,415,892 B2
(45) Date of Patent: Jul. 9, 2002

(54) POWER CONTROL INCLUDING A SECONDARY BATTERY FOR POWERING AN ELEVATOR

(75) Inventors: Hiroshi Araki; Shinobu Tajima; Ikuro Suga; Kazuyuki Kobayashi, all of Tokyo (JP)

(73) Assignees: Mitsubishi Denki Kabushiki Kaisha; The Tokyo Electric Power Company, Incorporated, both of Tokyo (JP)

( * ) Notice: Subject to any disclaimer, the term of this patent is extended or adjusted under 35 U.S.C. 154(b) by 0 days.

(21) Appl. No.: 09/788,447

(22) Filed: Feb. 21, 2001

(30) Foreign Application Priority Data

Feb. 28, 2000 (JP) .......................................... 2000-051945

(51) Int. Cl.$^7$ ................................................ B66B 1/06
(52) U.S. Cl. ......................................... 187/290; 187/296
(58) Field of Search ............................... 187/290, 296, 187/297, 247; 320/150, 153, 116–121; 318/375, 376; 307/64, 66

(56) References Cited

U.S. PATENT DOCUMENTS

| | | | |
|---|---|---|---|
| 4,503,940 A | * 3/1985 | Watanabe | 187/29 R |
| 4,554,999 A | * 11/1985 | Kamike | 187/29 R |
| 5,254,929 A | * 10/1993 | Yang | 320/15 |
| 5,341,902 A | * 8/1994 | Ruiz, Sr. et al. | 187/19 |
| 5,712,456 A | 1/1998 | McCarthy et al. | |
| 5,821,476 A | * 10/1998 | Hakala et al. | 187/290 |
| 5,896,948 A | * 4/1999 | Suur-Askola et al. | 187/290 |
| 5,909,017 A | * 6/1999 | Born et al. | 187/297 |
| 6,315,081 B1 | * 11/2001 | Yeo | 187/290 |

FOREIGN PATENT DOCUMENTS

| | | |
|---|---|---|
| JP | 61-267675 | 11/1986 |
| JP | 7-252040 | 10/1995 |
| JP | 10-67469 | 3/1998 |
| JP | 11-299275 | 10/1999 |

* cited by examiner

*Primary Examiner*—Jonathan Salata
(74) *Attorney, Agent, or Firm*—Leydig, Voit & Mayer, Ltd.

(57) ABSTRACT

A controller of an elevator in which space for mounting a power accumulating device can be saved and the controller can be applied to an elevator having no machine room. The controller has a power accumulating device arranged between DC buses connected to a converter and an inverter, and accumulating DC power from the DC buses during a regenerative operation of the elevator and supplying the DC power accumulated to the DC buses during a power operation; and a charging-discharging control for controlling charging and discharging of the power accumulating device with respect to the DC buses. The power accumulating device includes a secondary battery and a DC—DC converter for controlling charging and discharging of the secondary battery, and the secondary battery includes plural cells connected in series. The secondary battery is arranged at any one of four corners within an elevator shaft, near a rail, or near a cable within the elevator shaft.

9 Claims, 6 Drawing Sheets

POWER CONTROL INCLUDING A SECONDARY BATTERY FOR POWERING AN ELEVATOR

BACKGROUND OF THE INVENTION

1. Field of the Invention

This invention relates to a controller of an elevator of an energy saving type to which a secondary battery such as a nickel hydrogen battery, a nickel cadmium battery, a lithium ion battery, etc. is applied.

2. Description of the Related Art

Figure 4:
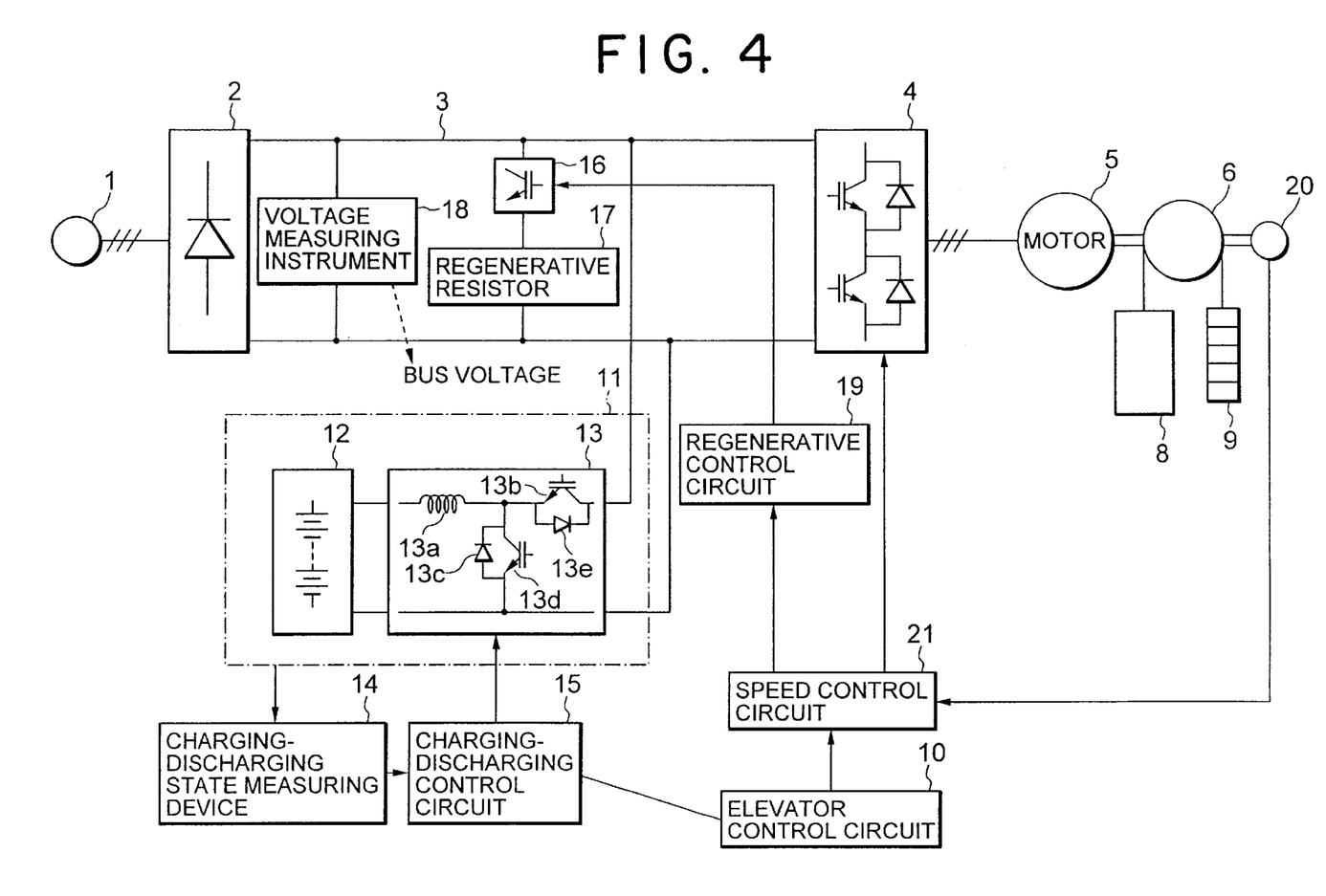
FIG. 4 is a block diagram showing the construction of a controller of an elevator in a conventional example.

FIG. 4 is a view showing the basic construction of a controller for controlling the operation of an elevator by applying a conventional secondary battery thereto.

In FIG. 4, reference numerals 1 and 2 respectively designate a three-phase AC power source and a converter constructed by a diode, etc. and converting AC power outputted from the three-phase AC power source 1 to DC power. The DC power converted by the converter 2 is supplied to a DC bus 3. The operation of an inverter 4 is controlled by a speed controller for controlling a speed position of the elevator and described later. A direct current supplied through the DC bus 3 is converted to an alternating current of predetermined desirable variable voltage and variable frequency and an AC motor 5 is driven so that a hoisting machine 6 of the elevator directly connected to the AC motor 5 is rotated. Thus, a rope 7 wound around the hoisting machine 6 controls elevating and lowering operations of a car 8 and a counterweight 9 connected to both ends of this rope 7 and passengers within the car 8 are moved to a predetermined stage floor.

Here, weights of the car 8 and the counterweight 9 are designed such that these weights are approximately equal to each other when passengers half a number limit ride in the car 8. Namely, when the car 8 is elevated and lowered with no load, a power running operation is performed at a lowering time of the car 8 and a regenerative operation is performed at a elevating time of the car 8. Conversely, when the car 8 is lowered in the number limit riding, the regenerative operation is performed at the lowering time of the car 8 and the power running operation is performed at the elevating time of the car 8.

An elevator control circuit 10 is constructed by a microcomputer, etc., and manages and controls an entire operation of the elevator. A power accumulating device 11 is arranged between DC buses 3 and accumulates power at the regenerative operation time of the elevator, and supplies the accumulated power to the inverter 4 together with the converter 2 at the power running operation time. The power accumulating device 11 is constructed by a secondary battery 12 and a DC—DC converter 13 for controlling charging and discharging operations of this secondary battery 12.

Here, the DC—DC converter 13 has a voltage lowering type chopper circuit and a voltage raising type chopper circuit. The voltage lowering type chopper circuit is constructed by a reactor 13a, a gate 13b for charging current control connected in series to this reactor 13a, and a diode 13c connected in reverse parallel to a gate 13d for discharging current control described later. The voltage raising type chopper circuit is constructed by the reactor 13a, the gate 13d for discharging current control connected in series to this reactor 13a, and a diode 13e connected in reverse parallel to the above gate 13b for charging current control operations of the gate 13b for charging current control and the gate 13d for discharging current control are controlled by a charging-discharging control circuit 15 on the basis of a measuring value from a charging-discharging state measuring device 14 for measuring charging and discharging states of the power accumulating device 11 and a measuring value from a voltage measuring instrument 18. A current measuring instrument arranged between the secondary battery 12 and the DC—DC converter 13 is used as the charging-discharging state measuring device 14 in this conventional example.

A gate 16 for regenerative current control and a regenerative resistor 17 are arranged between DC buses 3. The voltage measuring instrument 18 measures the voltage of a DC bus 3. A regenerative control circuit 19 is operated on the basis of regenerative control commands from a speed control circuit described later. The gate 16 for regenerative current control is constructed such that an ON pulse width is controlled on the basis of control of the regenerative control circuit 19 when a measuring voltage provided by the voltage measuring instrument 17 is equal to or greater than a predetermined value at the regenerative operation time. Regenerated power is discharged in the regenerative resistor 17 and is converted to thermal energy and is consumed.

An encoder 20 is directly connected to the hoisting machine 6. The speed control circuit 21 controls a position and a speed of the elevator by controlling an output voltage and an output frequency of the inverter 4 on the basis of speed commands and a speed feedback output from the encoder 22 based on commands from the elevator control circuit 10.

An operation of the controller having the above construction will next be explained.

At a power running operation time of the elevator, power is supplied to the inverter 4 from both the three-phase AC power source 1 and the power accumulating device 11. The power accumulating device 11 is constructed by the secondary battery 12 and the DC—DC converter 13, and an operation of this power accumulating device 11 is controlled by the charging-discharging control circuit 15. In general, the number of secondary batteries 12 is reduced as much as possible and an output voltage of each secondary battery 12 is lower than the voltage of the DC bus 3 so as to make the controller compact and cheaply construct the controller. The voltage of the DC bus 3 is basically controlled near a voltage provided by rectifying a three-phase AC of the three-phase AC power source 1. Accordingly, it is necessary to lower the bus voltage of the DC bus 3 at a charging time of the secondary battery 12 and raise the bus voltage of the DC bus 3 at a discharging time of the secondary battery 12. Therefore, the DC—DC converter 13 is adopted. Operations of the gate 13b for charging current control and the gate 13d for discharging current control in this DC—DC converter 13 are controlled by the charging-discharging control circuit 15.

Figure 5:
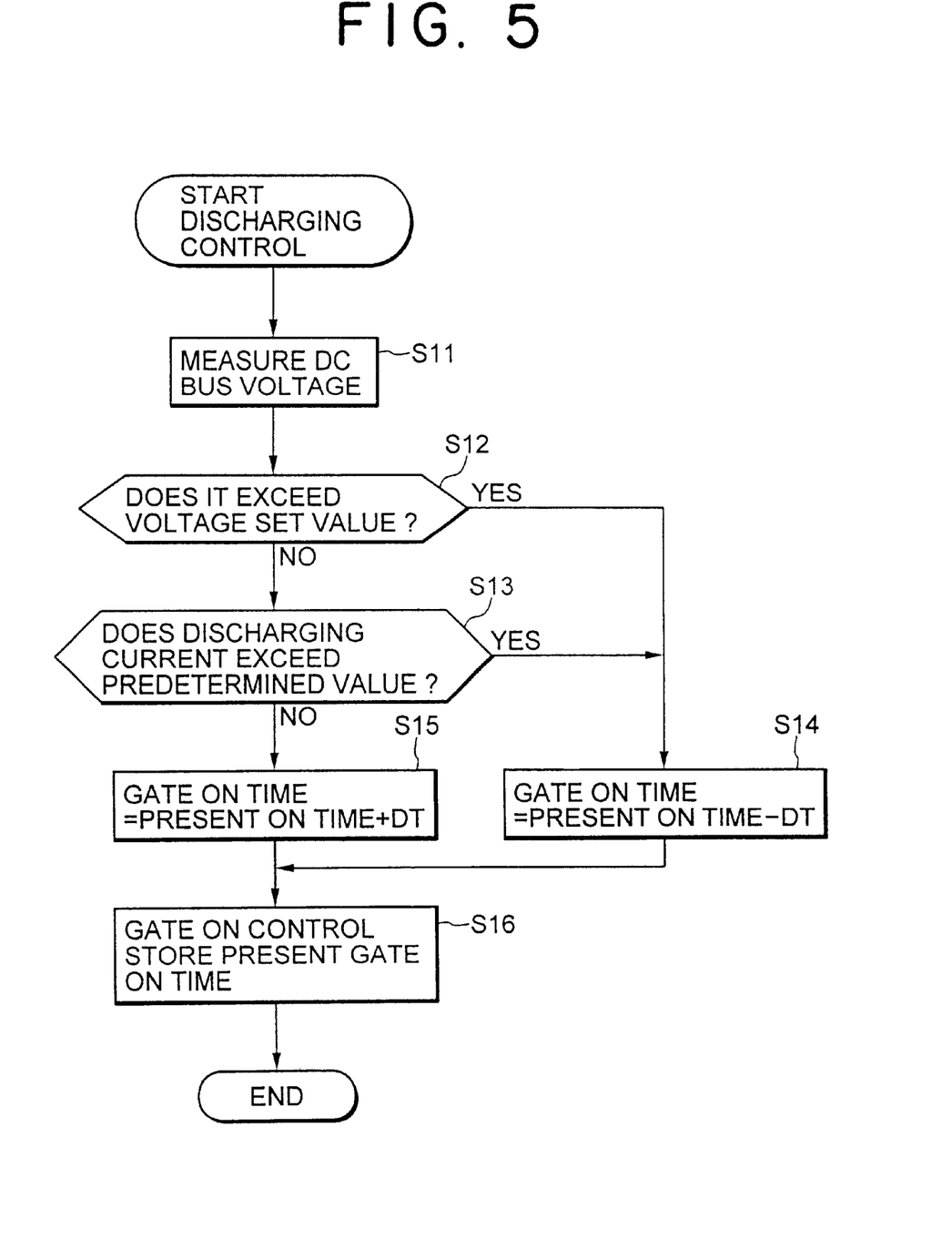
FIG. 5 is a flow chart showing the control of a charging-discharging control circuit shown in FIG. 4 during discharging.
Figure 6:
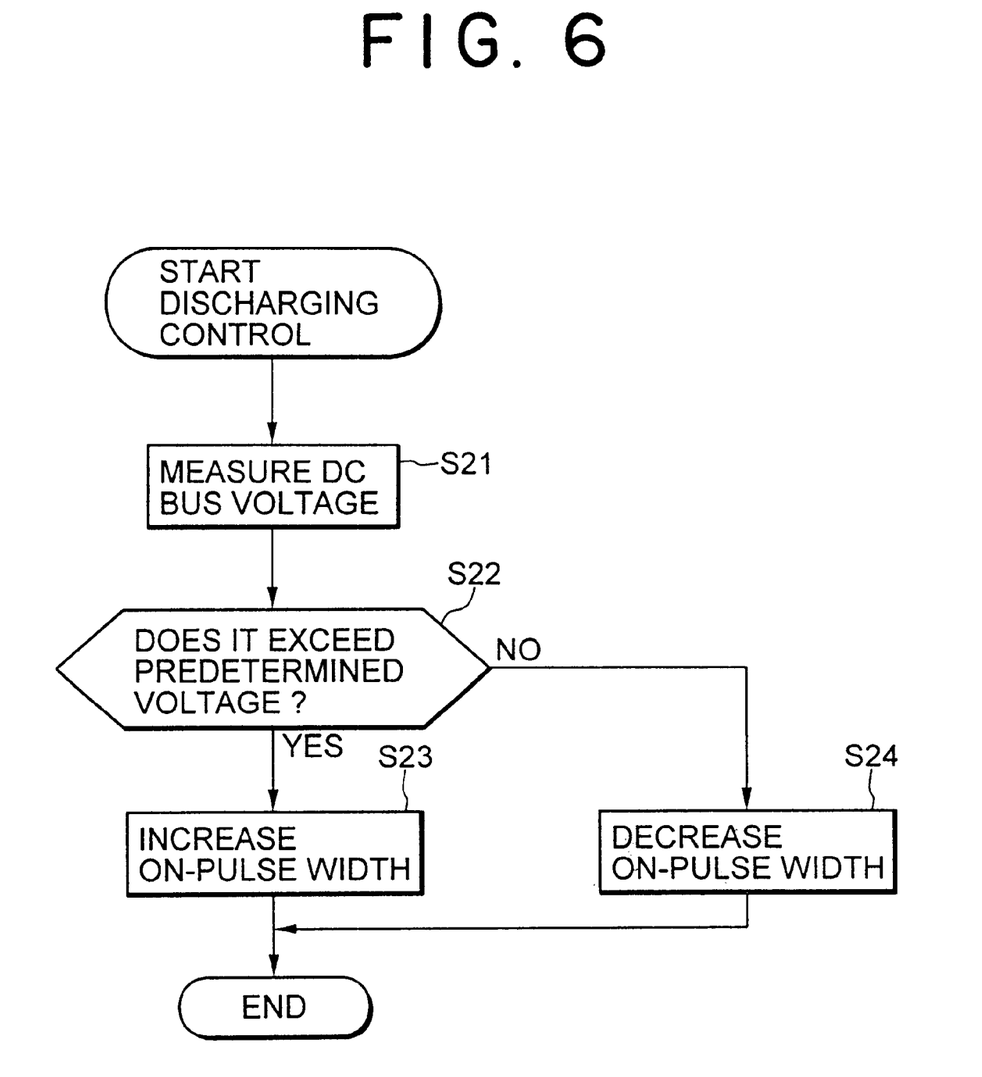
FIG. 6 is a flow chart showing the control of the charging-discharging control circuit 15 shown in FIG. 4 at its charging time.

FIGS. 5 and 6 are flow charts showing controls of the charging-discharging control circuit 15 at its discharging and charging times.

The control of the charging-discharging control circuit 15 at the discharging time shown in FIG. 5 will first be explained.

A current control minor loop, etc. are constructed in voltage control of a control system and the control operation may be more stably performed. However, for simplicity, the control of the charging-discharging control circuit 15 is here explained by a control system using the bus voltage.

First, the bus voltage of the DC bus 3 is measured by the voltage measuring instrument 17 (step S11). The charging-discharging control circuit 15 compares this measuring voltage with a predetermined desirable voltage set value and judges whether the measuring voltage exceeds the voltage set value or not (step S12). If no measuring voltage exceeds the set value, the charging-discharging control circuit 15 next judges whether the measuring value of a discharging current of the secondary battery 12 provided by the charging-discharging state measuring device 14 exceeds a predetermined value or not (step S13).

When the measuring voltage exceeds the set value by these judgments, or when the measuring value of the discharging current of the secondary battery 12 exceeds the predetermined value even if no measuring voltage exceeds the set value, an adjusting time DT is subtracted from the present ON time to shorten an ON pulse width of the gate 13d for discharging current control and a new gate ON time is calculated (step S14).

In contrast to this, when it is judged in the above step S13 that no measuring value of the discharging current of the secondary battery 12 provided by the measuring device 14 exceeds the predetermined value, a new gate ON time is calculated by adding the adjusting time DT to the present ON time so as to lengthen the ON pulse width of the gate 13d for discharging current control (step S15). Thus, ON control of the gate 13d for discharging current control is performed on the basis of the calculated gate ON time, and the calculated gate ON time is stored to a built-in memory as the present ON time (step S16).

Thus, a more electric current flows from the secondary battery 12 by lengthening the ON pulse width of the gate 13d for discharging current control. As a result, supply power is increased and the bus voltage of the DC bus 3 is increased by the power supply. When the power running operation is considered, the elevator requires the power supply and this power is supplied by discharging from the above secondary battery 12 and power supply from the three-phase AC power source 1. When the bus voltage is controlled such that this bus voltage is higher than an output voltage of the converter 2 supplied from the three-phase AC power source 1, all power is supplied from the secondary battery 12. However, the controller is designed such that all power is not supplied from the secondary battery 12, but is supplied from the secondary battery 12 and the three-phase AC power source 1 in a suitable ratio so as to cheaply construct the power accumulating device 11.

Namely, in FIG. 5, the measuring value of the discharging current is compared with a supply allotment corresponding current (predetermined value). If this measuring value exceeds the predetermined value, the ON pulse width of the gate 13d for discharging current control is lengthened and a supply amount is further increased. In contrast to this, when no measuring value of the discharging current exceeds the predetermined value, the ON pulse width of the gate 13d for discharging current control is shortened and the power supply is clipped. Thus, since power supplied from the secondary battery 12 is clipped among power required in the inverter 4, the bus voltage of the DC bus 3 is reduced so that the power supply from the converter 2 is started. These operations are performed for a very short time so that a suitable bus voltage is actually obtained to supply required power of the elevator. Thus, power can be supplied from the secondary battery 12 and the three-phase AC power source 1 in a predetermined desirable ratio.

The control of the charging-discharging control circuit 15 at the charging time shown in FIG. 6 will next be explained.

When there is power regeneration from the AC motor 5, the bus voltage of the DC bus 3 is increased by this regenerated power. When this voltage is higher than an output voltage of the converter 2, the power supply from the three-phase AC power source 1 is stopped. When there is no power accumulating device 11 and this stopping state is continued, the voltage of the DC bus 3 is increased. Therefore, when a measuring voltage value of the voltage measuring instrument 17 for detecting the bus voltage of the DC bus 3 reaches a certain predetermined voltage, the regenerative control circuit 19 is operated and closes the gate 16 for regenerative current control. Thus, power flows through the regenerative resistor 17 and the regenerated power is consumed and the elevator is decelerated by electromagnetic braking effects. However, when there is the power accumulating device 11, this power is charged to the power accumulating device 11 by the control of the charging-discharging control circuit 15 with a voltage equal to or smaller than a predetermined voltage.

Namely, as shown in FIG. 6, if the measuring value of the bus voltage of the DC bus 3 provided by the voltage measuring instrument 17 exceeds the predetermined voltage, the charging-discharging control circuit 15 detects that it is a regenerative state, and increases a charging current to the secondary battery 12 by lengthening the ON pulse width of the gate 13b for charging current control (step S21→S22→S23). When the regenerated power from the elevator is reduced in a short time, the voltage of the DC bus 3 is also correspondingly reduced and no measuring value of the voltage measuring instrument 17 exceeds the predetermined voltage. Accordingly, the ON pulse width of the gate 13b for charging current control is shortly controlled and charging power is also reduced and controlled (step S21→S22→S24).

Thus, the bus voltage is controlled in a suitable range and a charging operation is performed by monitoring the bus voltage of the DC bus 3 and controlling the charging power. Further, energy is saved by accumulating and re-utilizing power conventionally consumed in the regenerated power.

In recent years, an elevator requiring no machine room, e.g., an elevator having no machine room by arranging a winding machine 6 and a control board within an ascending/descending path, has spread. In the elevator of an energy saving type shown in the above conventional example, many power accumulating devices 11 are required so that a space for mounting these power accumulating devices is a problem.

SUMMARY OF THE INVENTION

To solve the above problems, an object of this invention is to provide a controller of an elevator in which a space for mounting power accumulating devices can be saved and the controller can be applied to the elevator having no machine room.

To achieve this object, a controller of an elevator in this invention comprises a converter for rectifying AC power from an AC power source and converting the AC power to DC power; an inverter for converting the DC power to AC power of a variable voltage and a variable frequency and driving an electric motor and operating the elevator; power accumulating means arranged between DC buses between the converter and the inverter, and accumulating DC power from the DC buses at a regenerative operation time of the elevator and supplying the DC power accumulated on the DC buses at a power running operation time; and charging-discharging control means for controlling charging and discharging operations of the power accumulating means with respect to the DC buses; the controller being characterized in that the power accumulating means is constructed by a secondary battery and a DC—DC converter for controlling charging and discharging operations of the secondary battery, and the secondary battery is constructed by connecting plural cells in series to each other.

Further, the secondary battery of the power accumulating device is constructed by connecting plural cells in series to each other in a bar shape and arranging the cells in a vertical direction within an ascending/descending path.

Further, the secondary battery of the power accumulating device is constructed by plural set batteries such that terminal portions of the plural cells are fixedly connected to each other and female screw terminals are attached to both ends of each set battery as one set, and the plural set batteries are connected to each other in one bar shape by using a double-end stud and are stored into a cylindrical case.

Further, each of the cells of the power accumulating device is arranged with the side of a pressure safety valve facing upward.

Further, the power accumulating device is arranged in a clearance of an ascending/descending path and a car.

Further, the power accumulating device is arranged at any one of four corners within an ascending/descending path, a portion near a rail, or a portion near a cable within the ascending/descending path.

Further, a cooler for forced air cooling is arranged at any one of above, below, or both above and below of the power accumulating device.

Further, an air cooling fan for flowing a wind in a vertical direction is attached to the power accumulating device.

Further, the controller further comprises a temperature measuring device for measuring a temperature of the power accumulating device; and a control device for operating the cooler when a detecting temperature of the temperature measuring device is equal to or greater than a predetermined value.

Further, the temperature measuring device measures the temperature of a side face of a cell near a terminal end on an unarranging side of the cooler, or the temperature of a side face of a cell near a center when the cooler is arranged on each of both sides.

DESCRIPTION OF THE PREFERRED EMBODIMENTS

Similar to the conventional example, an elevator in this invention has a construction shown in FIG. 4, and charging and discharging operations of a secondary battery of a power accumulating device are performed. However, in this invention, as described later, a hoisting machine is arranged in a pit portion within an ascending/descending path, and a control board having the other control constructions is arranged in an inner wall of the ascending/descending path, and no machine room is provided in a top portion of the ascending/descending path.

In this invention, the secondary battery of the power accumulating device is constructed by connecting plural cells in series. Thus, a mounting space of the power accumulating device is saved and this invention is applied to the elevator having no machine room.

Concrete embodiments will next be described in detail.

Embodiment mode 1

Figure 1:
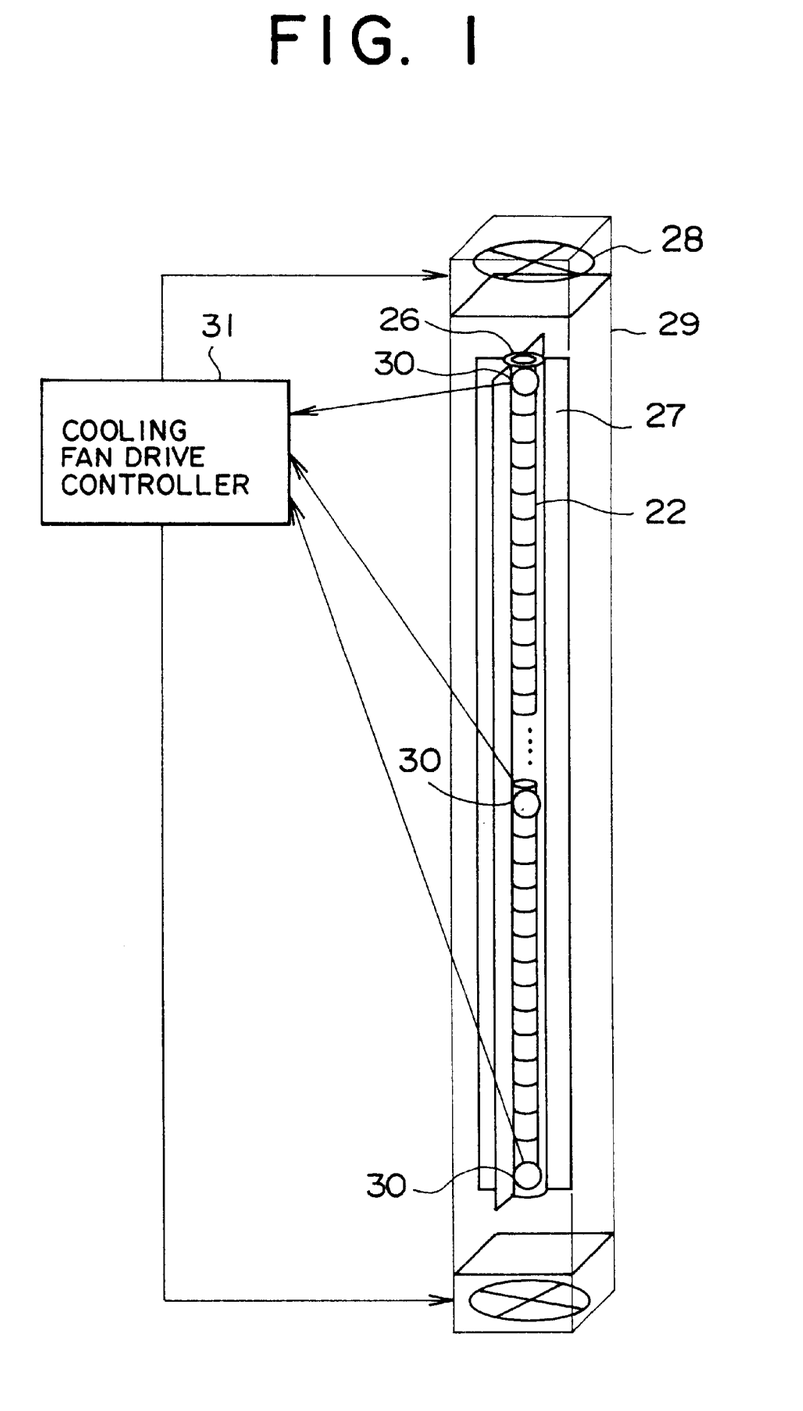
FIG. 1 is an explanatory view showing the construction of a secondary battery portion of a power accumulating device in this invention.

FIG. 1 is a view showing a constructional example of a secondary battery portion of a power accumulating device in an embodiment mode 1 of this invention.

Figure 2A:
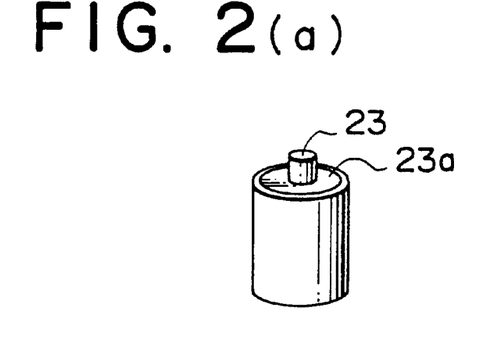
FIGS. 2a–2c is an explanatory view showing the connecting construction of a battery set having a long bar shape in FIG. 1.

In FIG. 1, reference numeral 22 designates a set battery used in the secondary battery 12 of the power accumulating device 11 shown in FIG. 4. As shown in FIG. 2 (refer (a)), this set battery 22 has a structure in which plural cells 23 such as nickel hydrogen batteries, etc. are combined and connected in series to each other. Each of the cells 23 has a pressure safety valve 23a for reducing an internal pressure of the battery at its abnormal time.

Figure 2B:
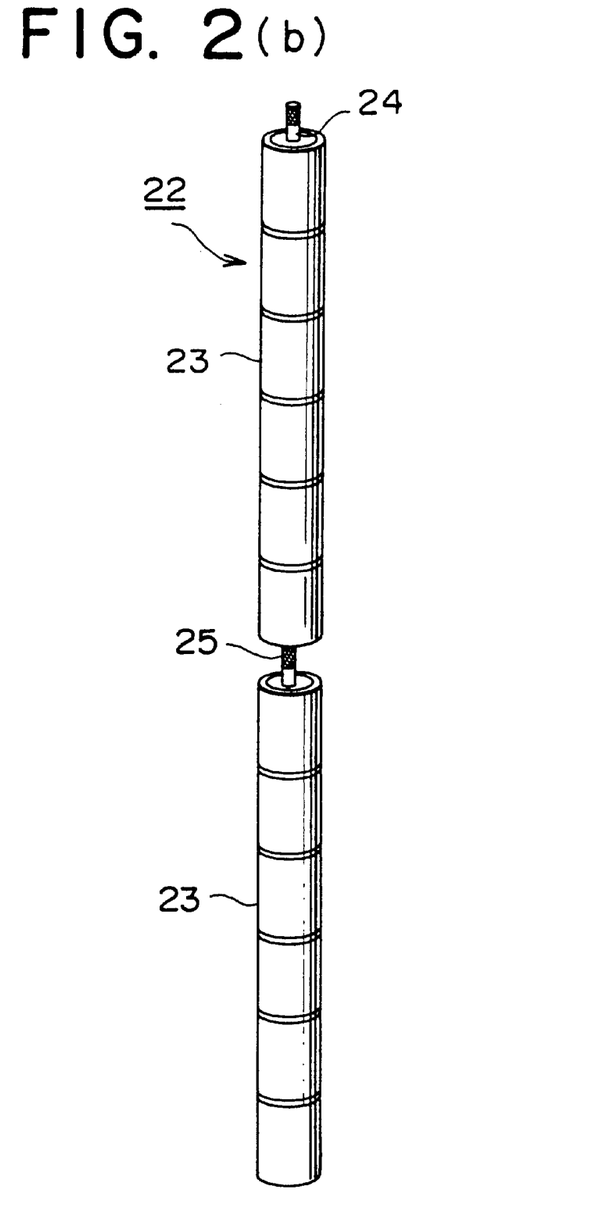
Figure 2C:
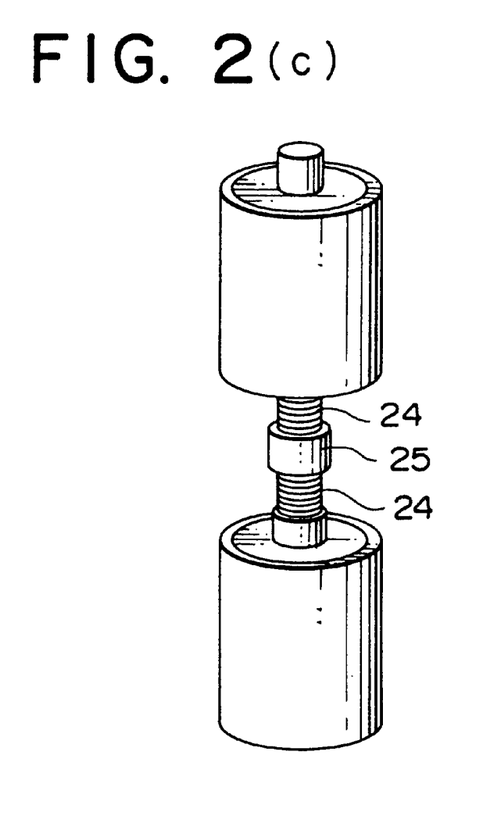

The plural cells 23 are connected to each other by welding, etc. so as to reduce contact resistance between terminals of the cells. As shown in FIG. 2 (refer (b)), female screw terminals 25 are attached by welding, etc. to both ends of the set battery 22. As shown in FIG. 2 (refer (b) and (c)), these plural set batteries 22 are connected in series to each other by a double-end stud terminal 25 constructed by a male screw. Namely, as shown in FIG. 2 (refer (b)), predetermined plural set batteries 22 are connected in series to each other by the double-end stud terminal 25 in accordance with a required capacity or voltage so that one set battery of a longer bar shape is constructed.

In FIG. 1, a cylindrical metallic case 26 is made of aluminum, etc. The set battery 22 of a long bar shape is sealed into this metallic case 26 in close contact with this metallic case so as not to reduce heat conduction. A required number of cooling fins 27 are attached to the metallic case 26 in accordance with predetermined required cooling ability such that a wind flows in a vertical direction. A cooling fan 28 is attached above or below the set battery 22, or both above and below the set battery 22 in accordance with necessity. Reference numeral 29 designates a wind channel duct. In FIG. 1, the wind channel duct 29 is formed in a rectangular parallelepiped shape, but may be also set to a cylindrical duct in accordance with an arranging place. When no forced air cooling is performed, the cooling fan 28 and the wind channel duct 29 are not required.

A temperature detecting sensor 30 measures the temperature of a side face of a cell near a terminal end on at least an unarranging side of the cooling fan 28, or the temperature of a side face of a cell near a center when the cooling fan 28 is arranged on each of both sides. A cooling fan drive controller 31 operates a cooler if the temperature measured by the temperature detecting sensor 30 is equal to or greater than a predetermined value.

Figure 3:
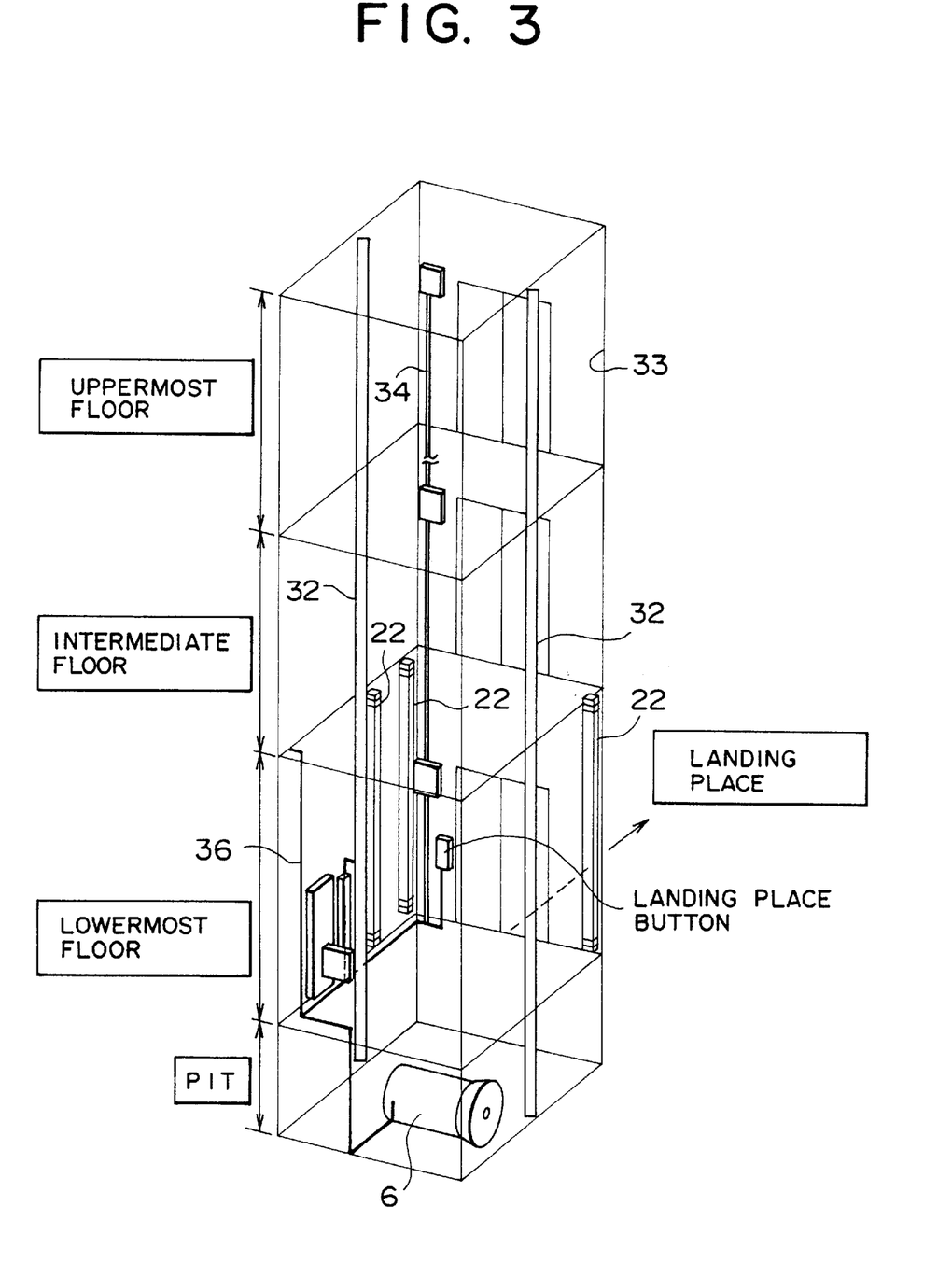
FIG. 3 is an explanatory view showing a mounting example of a secondary battery of the power accumulating device within an ascending/descending path of an elevator.

FIG. 3 is a view showing a mounting example of the secondary battery 12 of the power accumulating device 11 having the above construction within an ascending/descending path of the elevator.

In FIG. 3, reference numerals 32, 33 and 34 respectively designate a guide rail of a car 8, a balance weight 9, etc. of the elevator shown in FIG. 4, an ascending/descending path, and an electric wire within the ascending/descending path 33. A hoisting machine 6 shown in FIG. 4 is arranged in a pit portion of the ascending/descending path 33. A control board 36 having a control construction shown in FIG. 4 is arranged in an inner wall of the ascending/descending path 33, and no machine room is arranged in a top portion of the ascending/descending path.

The set battery 22 used as the secondary battery 12 is arranged in a vertical direction within the ascending/descending path 33 in a state in which the part with pressure safety valve 23a is arranged upward. The set battery 22 is arranged at each of four corners of the ascending/descending path 33, or a portion near the rail, or a portion near a cable arranged in the ascending/descending path 33, in a clearance of the ascending/descending path 33 and the car. This is because attachment can be commonized and space is effectively utilized when the set battery 22 is arranged at each of the four corners of the ascending/descending path 33 which are dead spaces, or the guide rail 32 arranged in the vertical direction within the ascending/descending path 33, or a side of the electric wire 34.

Accordingly, the controller of the elevator has the following effects as mentioned above.

Since the plural cells 23 are connected in series and are constructed in a bar shape as the secondary battery 12 of the power accumulating device 11, an arranging space is effectively arranged in the vertical direction within the ascending/descending path 33 and is greatly saved in the case of an elevator of a type having no machine room.

In the case of the cell 23 having the pressure safety valve 23a, the pressure safety valve 23a is arranged in an upward direction so that no function of the safety valve is obstructed.

Space is also effectively utilized when the set battery 22 is arranged at each of the four corners of the ascending/descending path 33 which are dead spaces. Also, attachment can be commonized and space is effectively utilized when the set battery 22 is arranged in the guide rail 32 arranged in the vertical direction within the ascending/descending path 33 and is arranged on a side of the electric wire 34 within the ascending/descending path.

Further, cooling effects can be efficiently obtained in a saved space by using the cooling fin 27 and the cooling fan 28 with respect to the secondary battery having the possibility that charging and discharging characteristics become worse and further the battery is broken with respect to an excessive increase in temperature.

In the case of air cooling using only the cooling fin 27, the cooling fin 27 is arranged such that a wind flows in the vertical direction of the ascending/descending path 33. Accordingly, the cooling can be efficiently performed by the wind in the vertical direction generated by running the elevator so that cooling fan 28 is not required and further space can be saved.

The temperature sensor 30 is arranged in a supposing position of a maximum temperature of the set battery 22 so that the number of temperature sensors 30 can be minimized.

Further, energy can be saved by the temperature sensor 30 and the cooling fan drive controller 33 since cooling is performed only when the temperature is equal to or higher than a predetermined temperature, i.e., only at a necessary time.

As mentioned above, in accordance with this invention, plural cells are connected in series and are constructed as the secondary battery of the power accumulating device. Accordingly, a mounting space of the power accumulating device can be saved and this invention can be applied to an elevator having no machine room.

What is claimed is:

1. A power control including a secondary battery for powering an elevator, the power control comprising:

a converter for rectifying AC power from an AC power and converting the AC power to DC power;

a power accumulating device for accumulating DC power and supplying DC power accumulated;

an inverter connected by DC buses to the converter for converting the DC power to AC power having a variable voltage and a variable frequency for driving an electric motor operating an elevator, wherein said power accumulating device is connected across said DC buses, and accumulates DC power from said DC buses during regenerative operation of the elevator and supplies DC power accumulated to said DC buses during a powering operation; and charging-discharging control means for controlling charging and discharging of said power accumulating means with respect to said DC buses, wherein said power accumulating means includes a secondary battery comprising a plurality of cells connected in series in a bar shape and arranged in a vertical direction along an ascending/descending path of the elevator, and a DC—DC converter for controlling charging and discharging of the secondary battery.

2. The power control for an elevator according to claim 1, wherein the secondary battery includes sets of batteries, the secondary battery and terminals of the plural cells are fixedly connected to each other, female screw terminals are attached to opposite ends of each set of batteries, and the plural sets of batteries are connected to each other in a single bar shape by a double-end stud and are stored a cylindrical case.

3. The power control for an elevator according to claim 1, wherein each of the cells of said power accumulating device has a pressure safety valve facing upward.

4. The power control for an elevator according to claim 1, wherein said power accumulating device is located within a clearance between an ascending/descending path of the elevator and a car of the elevator.

5. The power control for an elevator according to claim 1, wherein said power accumulating device is located at one of four corners with an ascending/descending path of the elevator, near a rail of the elevator, and near a cable within the ascending/descending path of the elevator.

6. The power control for an elevator according to claim 1, including a cooler for forced air cooling located at at least one of above and below said power accumulating device.

7. The power control for an elevator according to claim 1, including an air cooling fan attached to said power accumulating device.

8. The power control for an elevator according to claim 6, wherein the controller further comprises:

a temperature measuring device for measuring temperature of said power accumulating device; and a control device for operating said cooler when the temperature measured by said temperature measuring device is at least equal to a predetermined temperature.

9. The power control for an elevator according to claim 8, wherein said temperature measuring device measures the temperature at one of a side face of a cell near a terminal end where said cooler is absent, and the temperature of a side face of a central cell when said cooler is located on both sides of said power accumulating device.

* * * * *